(12) United States Patent  (10) Patent No.: US 8,523,255 B2
Fukano et al.  (45) Date of Patent: Sep. 3, 2013

(54) SUCTION APPARATUS EQUIPPED WITH EJECTOR

(75) Inventors: Yoshihiro Fukano, Moriya (JP); Koji Sugano, Koshigaya (JP); Yasuhiko Obata, Sumida-ku (JP); Akira Sasaki, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/438,104

(22) Filed: Apr. 3, 2012

(65) Prior Publication Data

US 2012/0256433 A1 Oct. 11, 2012

(30) Foreign Application Priority Data

Apr. 6, 2011 (JP) ................................. 2011-084875

(51) Int. Cl.
*B25J 15/06* (2006.01)
(52) U.S. Cl.
USPC ........................................ 294/183; 294/64.2
(58) Field of Classification Search
USPC .... 294/185–189, 183, 64.2, 64.3; 248/205.8, 248/205.9; 414/627, 737, 752.1; 901/40
See application file for complete search history.

(56) References Cited

U.S. PATENT DOCUMENTS

| 3,349,927 | A | * | 10/1967 | Blatt | 414/627 |
| 3,568,959 | A | * | 3/1971 | Blatt | 294/64.2 |
| 4,662,668 | A | * | 5/1987 | Hufford | 294/185 |
| 4,828,306 | A | * | 5/1989 | Blatt | 294/64.2 |
| 4,919,986 | A | * | 4/1990 | Lay et al. | 428/63 |
| 5,211,435 | A | * | 5/1993 | Nagai et al. | 294/186 |
| 5,708,381 | A | * | 1/1998 | Higashisaka | 327/276 |
| 6,213,521 | B1 | * | 4/2001 | Land et al. | 285/61 |
| 6,213,528 | B1 | * | 4/2001 | Hufken et al. | 294/186 |
| 6,502,877 | B2 | * | 1/2003 | Schick et al. | 294/65 |
| 7,404,536 | B2 | * | 7/2008 | Kalb | 248/205.5 |
| 2001/0045755 | A1 | * | 11/2001 | Schick et al. | 294/65 |
| 2008/0202602 | A1 | * | 8/2008 | Flaim et al. | 137/488 |

* cited by examiner

*Primary Examiner* — Paul T Chin
(74) *Attorney, Agent, or Firm* — Oblon, Spivak, McClelland, Maier & Neustadt, L.L.P.

(57) ABSTRACT

A retaining stud is inserted from a bottom portion of a suction pad that constitutes part of an ejector equipped suction apparatus, and an end of the retaining stud is inserted into an adapter plate. Further, a small diameter portion of a lock plate engages with a lock plate groove, which is exposed externally on the retaining stud, whereby the retaining stud and the lock plate are connected together integrally. In addition, an ejector is fixed using a side wall portion of the adapter plate. A mounting bracket is attached to the adapter plate while covering the lock plate, and a transfer means such as a robot arm or the like is fixed to the mounting bracket using a bolt.

9 Claims, 6 Drawing Sheets

SUCTION APPARATUS EQUIPPED WITH EJECTOR

CROSS-REFERENCE TO RELATED APPLICATION

This application is based upon and claims the benefit of priority from Japanese Patent Application No. 2011-084875 filed on Apr. 6, 2011, of which the contents are incorporated herein by reference.

BACKGROUND OF THE INVENTION

1. Field of the Invention

The present invention relates to a suction apparatus equipped with an ejector, which is capable of attracting a workpiece under suction by a negative-pressure fluid, and of transporting the workpiece to a predetermined location.

2. Description of the Related Art

Recently, vacuum suction apparatus have widely been used for transporting and positioning thin-plate workpieces. Such a vacuum suction apparatus is equipped with a main body into which a compressed fluid is supplied, and a suction pad that is fixed to the main body. Compressed fluid, which is supplied to the main body, creates a negative pressure state in the interior of the suction pad that is in contact with a workpiece to thereby retain the workpiece, and the workpiece is positioned in a desired location, or is transported to the desired location, and next, the vacuum state is released by supplying compressed air or atmospheric air to the suction pad, whereby the workpiece separates from the suction pad and is placed at the desired location.

As this type of vacuum suction apparatus, with the vacuum assembly disclosed in U.S. Patent Application Publication No. 2008/0202602 A1, legs are disposed mutually in parallel in the vicinity of both ends of an elongate positioning mechanism, with valve assemblies being mounted respectively on the legs. Each of the valve assemblies includes a vacuum circuit having a suction cup installed on the end thereof. Compressed air is supplied to the suction cups from an air pressure line, whereupon suction conveyance of workpieces is carried out by maintaining a negative pressure (vacuum) condition in the interior of the suction cups.

SUMMARY OF THE INVENTION

However, with the vacuum assembly according to the above-mentioned conventional technique, in the vacuum body there are installed a vacuum generating device, a ball joint, a valve body, a pilot valve, a flexible diaphragm, a valve cover, and the like. Thus, the structure is complex and maintenance thereon including exchange of component parts and the like is troublesome. In particular, with the aforementioned valve assembly, on a top portion of the suction cup, members that are comparatively heavy in weight, such as a suction cup collar, a vacuum body, a valve body, a pilot valve and a valve cover, are assembled in an aggregated manner. As a result, the top portion of the assembly is in an unstable condition with an abundance of heavy objects thereon. In addition, when workpieces are transported, the posture of workpieces transported by the suction cup also is unstable, such that the workpieces cannot be positioned reliably at a desired location.

A general object of the present invention is to provide a suction apparatus equipped with an ejector, which has a comparatively simple structure in which assembly of the apparatus is simplified and maintenance operations can easily be performed thereon. In particular, in the suction apparatus equipped with the ejector according to the present invention, exchange of the suction pad, and further, exchangeability of components of various mechanisms that are provided on an upper portion of the suction pad are improved, and accuracy in positioning and conveyance of workpieces is superior.

The present invention is characterized by an ejector equipped suction apparatus comprising a suction pad, an adapter plate fixed to a mounting portion formed on a top portion of the suction pad, an ejector disposed on the adapter plate, a lock plate disposed displaceably on an upper surface of the adapter plate, and a retaining stud, which is inserted from a side of a skirt portion that constitutes part of the suction pad and penetrates through a hole provided in the adapter plate, to thereby engage with the lock plate.

In accordance with the present invention, because the retaining stud is inserted from the side of the skirt portion of the suction pad and is made integral with the adapter plate, for example, when the suction pad is exchanged or replaced due to age-related changes in the suction pad or the like, or when maintenance operations are performed, such operations can be performed easily, simply by removing the retaining stud from the skirt portion. Accordingly, advantages are obtained in that such maintenance operations can easily be performed, and the structure of the ejector equipped suction apparatus as a whole is simplified. In particular, in comparison with the valve assembly according to the conventional technique, the apparatus is lighter in weight, and advantages are realized in that transferring of workpieces is facilitated, and accuracy in positioning of workpieces is superior.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
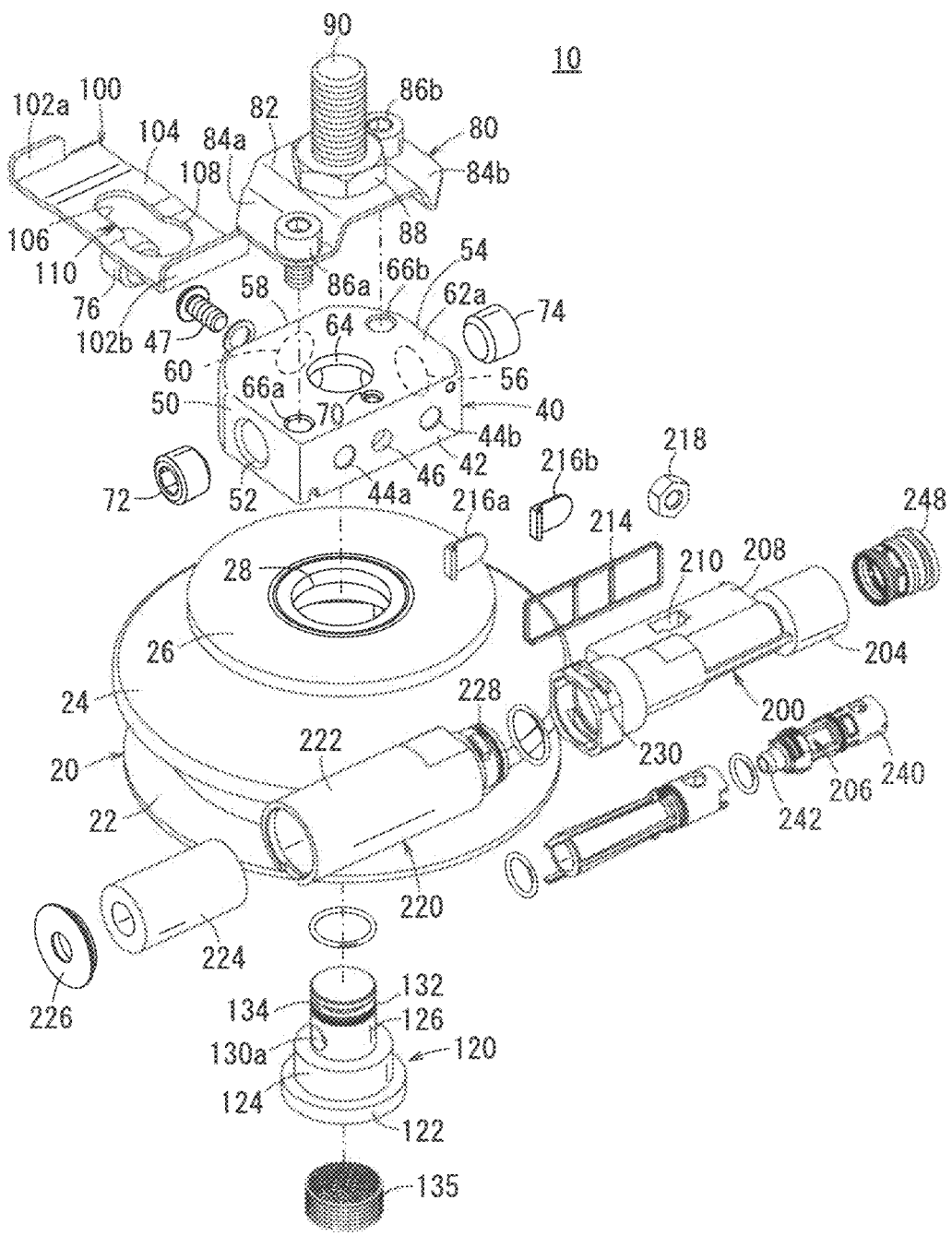
FIG. 1 is an exploded perspective view of essential parts of an ejector equipped suction apparatus according to an embodiment of the present invention.

In FIG. 1, reference numeral 10 indicates an ejector equipped suction apparatus (hereinafter also referred to simply as a suction apparatus) according to an embodiment of the present invention. The suction apparatus 10 includes a suction pad 20, an adapter plate 40, a mounting bracket 80, a lock plate 100, a retaining stud 120, and an ejector 200.

The suction pad 20 comprises a skirt portion 22 equipped with a suction surface that contacts a workpiece and retains the workpiece under suction, a cushion portion 24 connected to the skirt portion 22, and a mounting portion 26 formed at a location where the cushion portion 24 terminates. A hole 28 through which a second cylindrical section 126 of a later-described retaining stud 120 is inserted is formed in the center of the mounting portion 26. The skirt portion 22, the cushion portion 24, and the mounting portion 26 are constituted together integrally, and are formed from a flexible material, for example, synthetic resin, synthetic rubber or the like.

Figure 5:
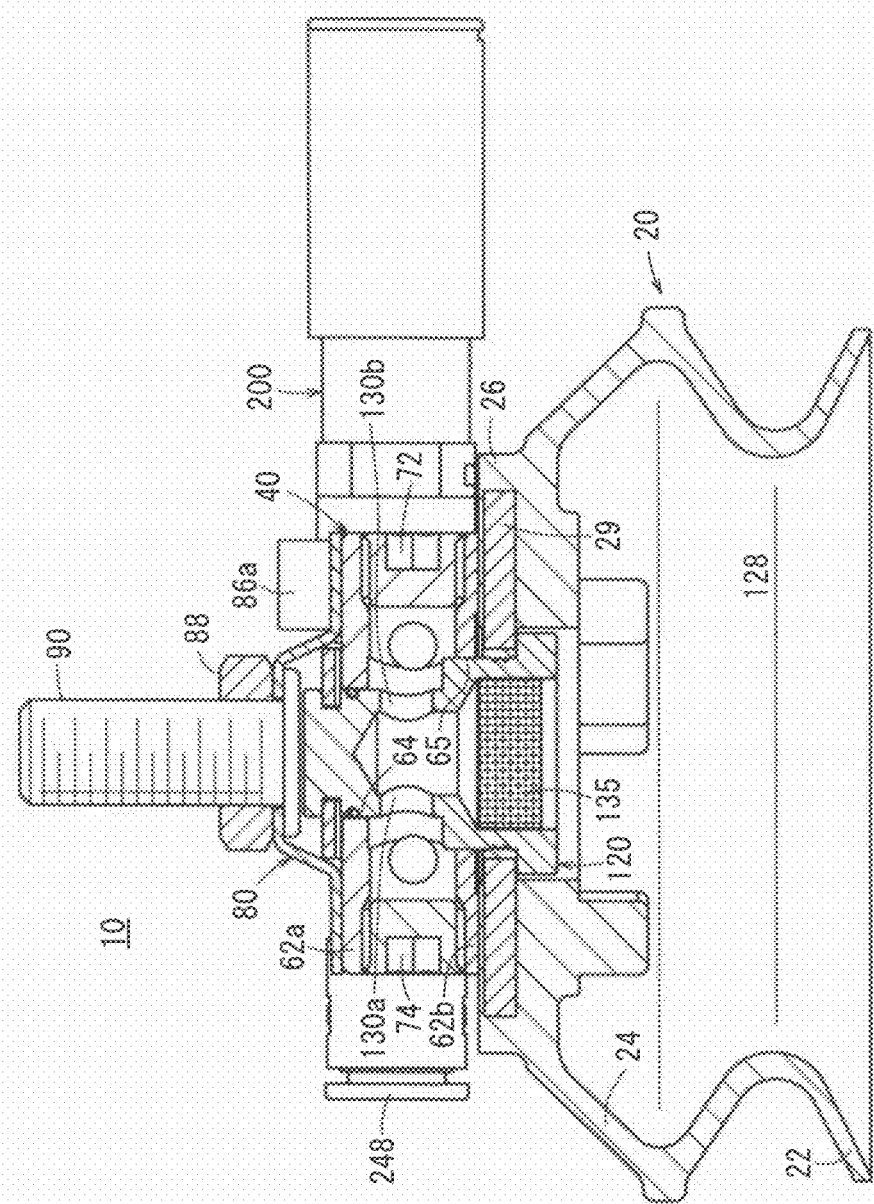
FIG. 5 is a cross-sectional view taken along line V-V of FIG. 4.

Further, as shown in FIG. 5, a reinforcing member (plate) 29 made from a ring-shaped hard synthetic resin preferably is embedded in the interior of the mounting portion 26. Owing thereto, a state of engagement between the mounting portion 26 and the later described adapter plate 40 can be maintained firmly and reliably. In this case, it is preferable upon recycling or disposal thereof if the suction pad 20 and the reinforcing member 29 are made up from synthetic resin materials having the same or similar properties.

The adapter plate 40 is disposed on a flat surface of the mounting portion 26. The adapter plate 40 exhibits a deformed trapezoidal shape as viewed in plan, and preferably is made of a metallic or hard resin material, which is formed in a hollow shape having a fluid passage formed in the interior thereof. On a first side surface 42 of the adapter plate 40, a small diameter first hole 44a, a second hole 46 with substantially the same diameter as the first hole 44a, and a third hole 44b adjacent to the second hole 46 are formed. As can be comprehended from FIG. 1, the first hole 44a, the second hole 46, and the third hole 44b are of substantially the same diameter, although the second hole 46 may be different in diameter from the first hole 44a and the third hole 44b.

Figure 2:
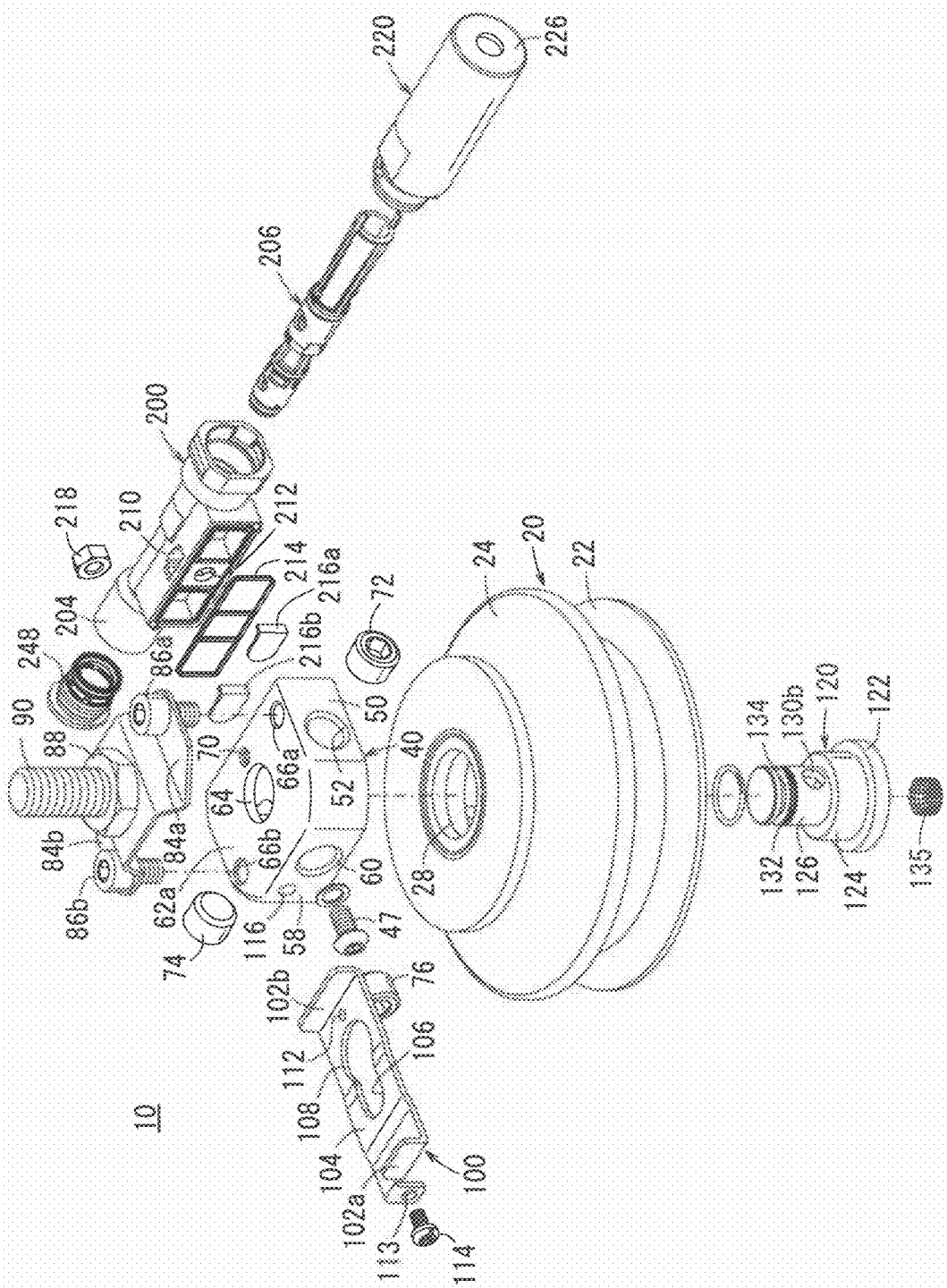
FIG. 2 is an exploded perspective view showing a condition in which the ejector equipped suction apparatus shown in FIG. 1 is displaced by 90°.
Figure 3:
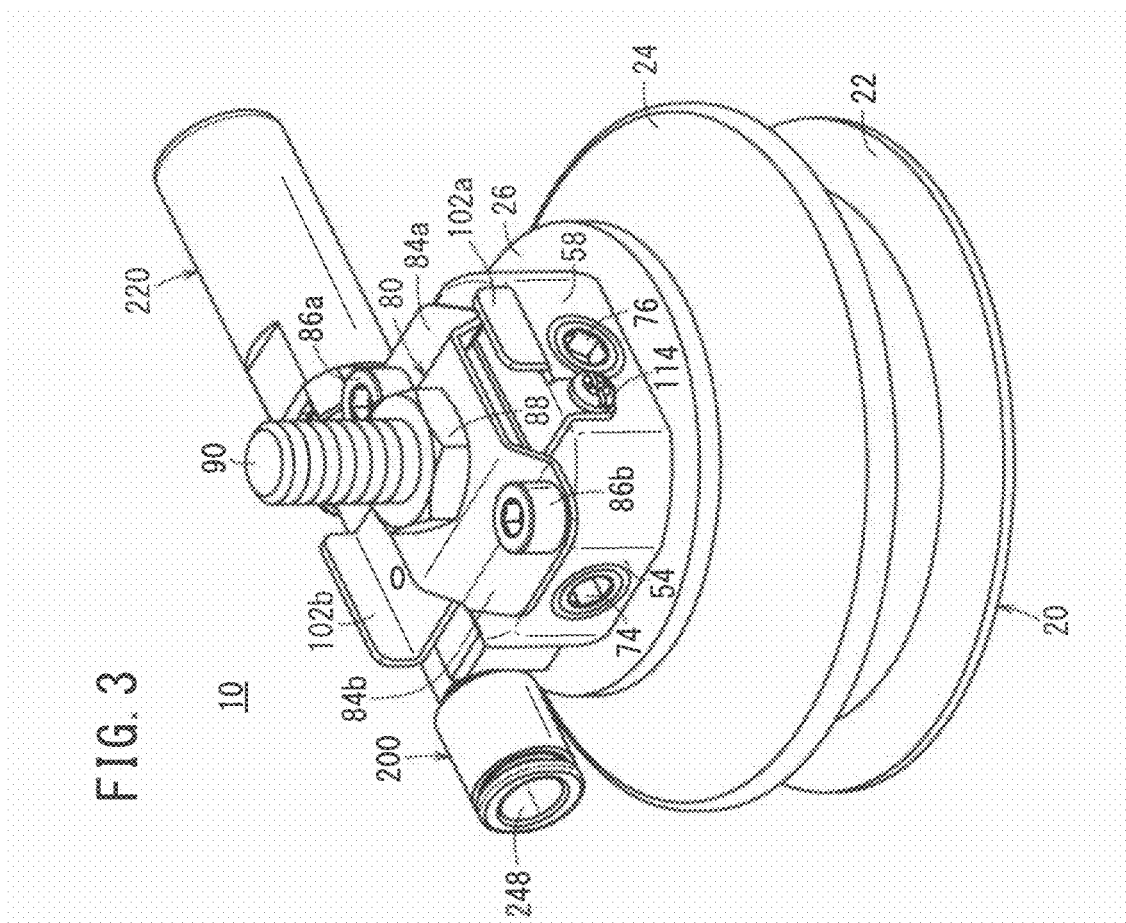
FIG. 3 is a perspective explanatory view of the ejector equipped suction apparatus.
Figure 4:
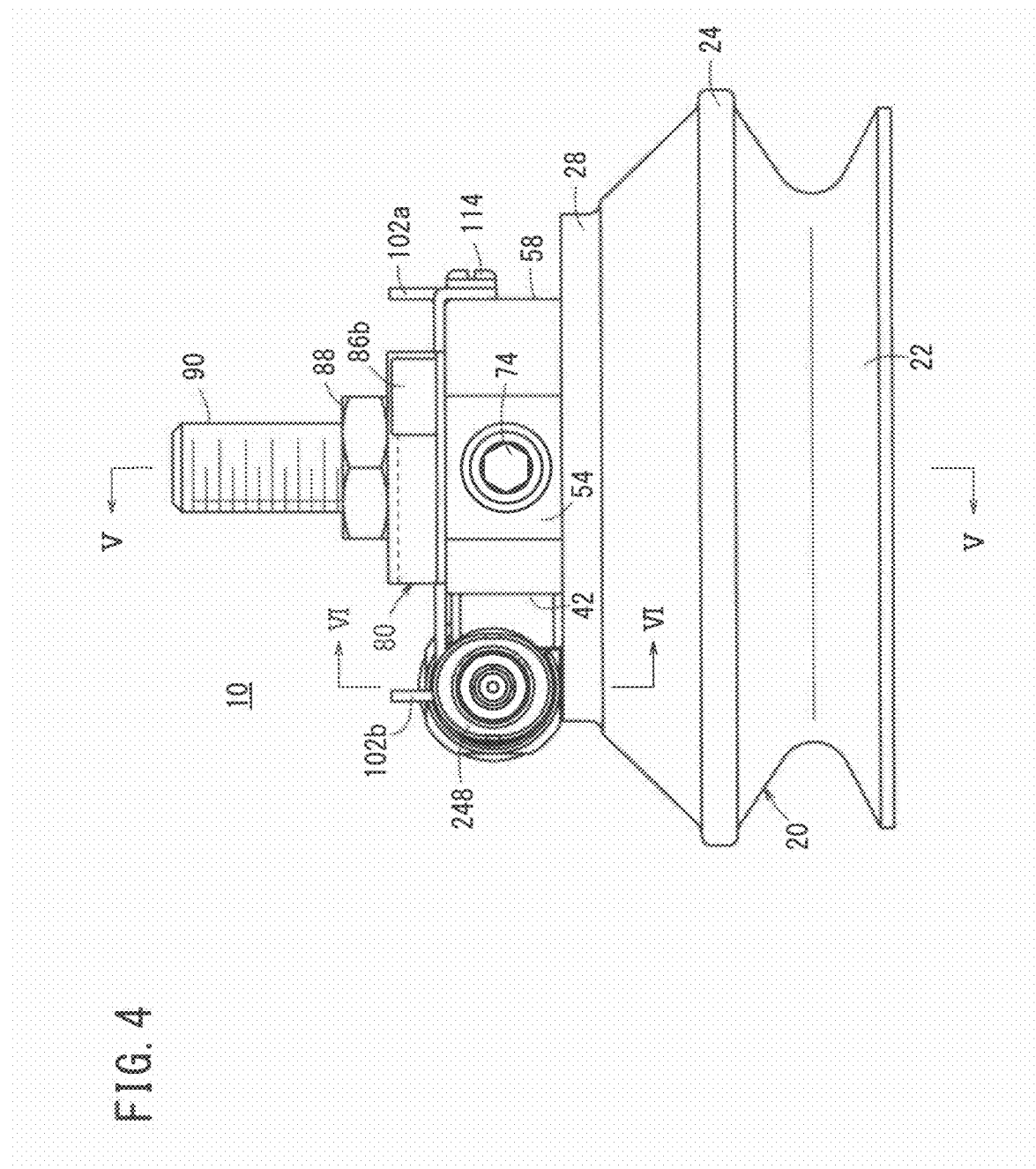
FIG. 4 is a front elevational view of the ejector equipped suction apparatus.

A bolt 47, which screw-engages with a nut 218 positioned on a mounting portion 208 of the later described ejector 200, is inserted through the second hole 46 (see FIGS. 1 and 2).

A large diameter fourth hole 52 is provided on a second side surface 50 of the adapter plate 40, and a fifth hole 56 is formed so as to confront the fourth hole 52 in a third side surface 54, which confronts the second side surface 50. In addition, a large diameter sixth hole 60 is formed so as to confront the second hole 46 in a fourth side surface 58, which confronts the first side surface 42. Furthermore, a first flat surface 62a is disposed perpendicularly to the first through fourth side surfaces 42, 50, 54, 58, and a second flat surface 62b is disposed on an opposite side from the first flat surface 62a, to thereby surround and enclose the interior space of the adapter plate 40.

A small diameter seventh hole 64, which is smaller than the hole 28, is disposed in the center of the first flat surface 62a, whereas an eighth hole 65 is formed to confront the seventh hole 64 in the center of the second flat surface 62b. Additionally, first screw grooves 66a and second screw grooves 66b that extend in the thickness direction of the adapter plate 40 are provided on the first flat surface 62a sandwiching the seventh hole 64 therebetween.

A recess 70 is disposed proximate to the second hole 46 on the first flat surface 62a. A first plug 72 and a second plug 74 are fitted selectively into the fourth hole 52 and the fifth hole 56 to thereby block the holes. A third plug 76, or alternatively an air supply system (not shown) for supplying fluid for breaking a vacuum, are fitted selectively into the sixth hole 60 that is disposed in the fourth side surface 58 of the adapter plate 40 to thereby block the sixth hole 60.

Next, a description shall be made concerning the mounting bracket 80. The mounting bracket 80 includes a bulging portion 82, which is erected upwardly in a center portion of the mounting bracket 80 shown in FIG. 1, and planar seating sections 84a, 84b provided on opposite sides of the bulging portion 82. Non-illustrated holes are formed on a diagonal line in corners of the seating sections 84a, 84b, with mounting bolts 86a, 86b being inserted through the holes. A bolt (retaining member) 90 for attachment to a non-illustrated robot arm stands upright through a nut 88 substantially in the center of the bulging portion 82. The mounting bolts 86a, 86b are capable of being threaded respectively into the first screw grooves 66a and the second screw grooves 66b, which are provided in the adapter plate 40.

The lock plate 100 is made up from a metallic plate-like body having a first operating member 102a and a second operating member 102b, which are bent and erected upwardly on opposite ends of the flat plate, together with a locking member 104 that rises upward slightly in a center portion thereof. From the locking member 104 to the second operating member 102b, a locking hole 110 is provided, which is formed by an interconnected small diameter portion 106 and a large diameter portion 108. A projection 112 is disposed between the large diameter portion 108 and the second operating member 102b (see FIG. 2), the projection 112 being capable of engagement with the recess 70 formed in the adapter plate 40.

One portion of the first operating member 102a is bent downwardly with a hole 113 formed therein. A bolt 114 is inserted through the hole 113 and is screw-engaged with a ninth hole 116 formed in the fourth side surface 58 of the adapter plate 40, for thereby fixing the lock plate 100.

Next, a description shall be given of the retaining stud 120 that penetrates through the hole 28 of the suction pad 20 and is exposed externally from the seventh hole 64 of the adapter plate 40.

The retaining stud 120 includes a large diameter flange 122. A first cylindrical section 124, which is somewhat smaller in diameter, is connected integrally with respect to the flange 122. The second cylindrical section 126, which is concentric with the flange 122 and the first cylindrical section 124, is connected to and extends from the first cylindrical section 124. Vacuum passages 130a, 130b, which are connected to a space formed at the interior of the flange 122 and the first cylindrical section 124, are arranged to confront each other mutually on the second cylindrical section 126.

An o-ring groove 132 is disposed on an outer circumferential portion on an upper part of the second cylindrical section 126 above the vacuum passages 130a, 130b, and a lock plate groove 134 that goes around the second cylindrical section 126 is formed above the o-ring groove 132. Reference numeral 135 in the drawings indicates a strainer, which is installed in the retaining stud 120 using the space of the flange 122, and which captures dust and the like that is sucked in under a suction action of the suction pad 20.

Next, the ejector 200 shall be described. The ejector 200 comprises a hollow and cylindrical shaped ejector body 204, and a vacuum generator (negative pressure generating section) 206, which is inserted in the interior of the ejector body 204. The ejector body 204 includes the mounting portion 208 on one side thereof. The mounting portion 208 having a rectangular parallelepiped shape includes a rectangular hole 210 that extends from a top portion to a bottom portion thereof, the hole 210 communicating with a hole 212 provided in a side wall of the mounting portion 208 (see FIG. 2). When assembled thereon, the hole 212 confronts the second hole 46 of the adapter plate 40. Furthermore, a gasket 214 is disposed on a side wall of the mounting portion 208 on which the hole 212 is provided, and plate-shaped check valves 216a, 216b are disposed via spaces formed in opposite sides of the gasket 214. The check valves 216a, 216b face toward the first hole 44a and the third hole 44b of the adapter plate 40, respectively. The nut 218 for attaching the ejector body 204 is inserted into the hole 210.

Figure 6:
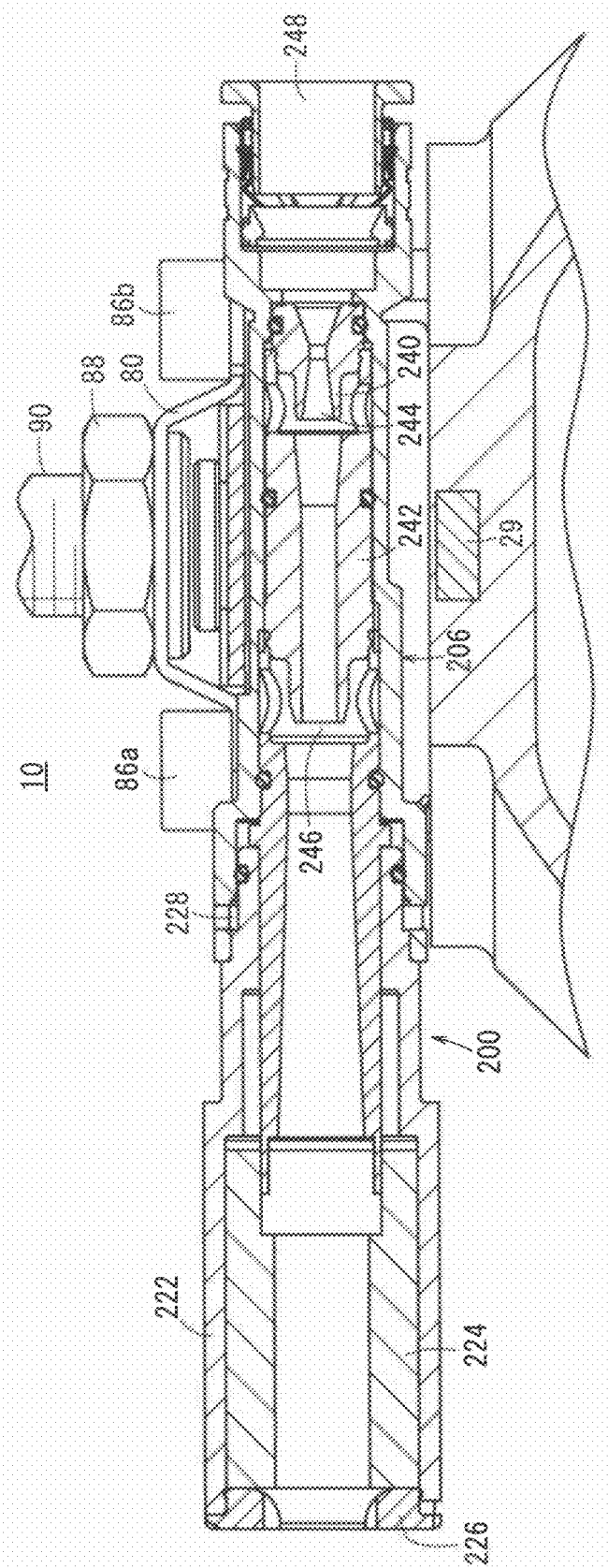
FIG. 6 is a cross-sectional view taken along line VI-VI of FIG. 4.

A cylindrical silencer 220 is fixed to one end of the ejector body 204. The silencer 220 is equipped with a cover member 222, a sound-deadening material 224 inserted in the interior of the cover member 222, and a lid member 226 fitted in an end of the cover member 222 and which fixes the sound-deadening material 224 in the interior of the cover member 222. A projection 228 is provided on the cover member 222. The projection 228 is fitted into a rectangular (elongate) hole 230 provided at one end of the ejector body 204 for integrally connecting the cover member 222 and the ejector body 204 to each other. The vacuum generator 206 is inserted in the interior of the cylindrical ejector body 204. As can be understood from FIG. 6, the vacuum generator 206 includes in the interior thereof a first nozzle 240 and a second nozzle 242, the first nozzle 240 and the second nozzle 242 being arranged in tandem. A first diffuser 244 is disposed between the first nozzle 240 and the second nozzle 242, and a second diffuser 246 is disposed on one end of the second nozzle 242. The second diffuser 246 faces toward the sound-deadening material 224 that is inserted inside the cover member 222. A one-touch coupling 248 is fitted into the side of the ejector body 204 opposite to the cover member 222.

The ejector equipped suction apparatus 10 according to the present invention is basically constructed as described above. Next, a method of assembling the suction apparatus 10 shall be explained.

First, the ejector 200, the lock plate 100 and the mounting bracket 80 are fixed to the adapter plate 40. For example, the check valves 216a, 216b are placed in abutment against the first hole 44a and the third hole 44b of the adapter plate 40, and the mounting portion 208, which is attached to the ejector body 204, is positioned through the gasket 214. The nut 218 for attaching the ejector body 204 is inserted beforehand into the hole 210 of the mounting portion 208, and the bolt 47 is inserted through the second hole 46 of the adapter plate 40 and is screw-engaged with the nut 218. As a result, the adapter plate 40 and the ejector 200 are connected together integrally.

Next, the lock plate 100 is positioned on the first flat surface 62a of the adapter plate 40. In this case, the large diameter portion 108 of the locking member 104 is positioned to correspond to the seventh hole 64 of the adapter plate 40. Then, the mounting bolts 86a, 86b of the mounting bracket 80 are screw-inserted into the first screw grooves 66a and the second screw grooves 66b of the adapter plate 40. In this manner, the adapter plate 40 and the mounting bracket 80, together with the lock plate 100 and the ejector 200 are connected together integrally.

In this state, next, the retaining stud 120 is inserted from the side of the skirt portion 22 of the suction pad 20. The top part of the retaining stud 120, more specifically, the top part of the second cylindrical section 126, extends upwardly from the hole 28 of the suction pad 20, and is exposed beyond the seventh hole 64 of the adapter plate 40. In this state, when the first operating member 102a of the lock plate 100 is operated so as to be made to approach the ejector 200, the small diameter portion 106 of the lock plate 100 engages in the lock plate groove 134 of the retaining stud 120, whereby as shown in FIG. 5, the retaining stud 120 is pulled upwardly from the bulging, i.e., the upstanding shaped, portion of the locking member 104. As a result, the suction pad 20 is positioned, fixed in place and locked between the adapter plate 40 and the retaining stud 120. For ensuring the locked condition, the bolt 114 is inserted from the hole 113 of the first operating member 102a provided on the lock plate 100, and by screw-insertion thereof into the ninth hole 116 provided in the adapter plate 40, the state of engagement between the retaining stud 120 and the adapter plate 40 is secured more firmly.

With respect to the ejector equipped suction apparatus 10 assembled in the foregoing manner, a tube connected to a non-illustrated pressure fluid (air) supply is inserted into the one-touch coupling 248. In addition, when compressed air is supplied to the ejector body 204 via the one-touch coupling 248, the compressed air is blown out vigorously from the first nozzle 240, whereupon the compressed air reaches the second nozzle 242 and is ejected toward the side of the sound-deadening material 224. During this time, the space in the interior of the suction pad 20 is evacuated by the first diffuser 244 and the second diffuser 246, i.e., the air in the interior of the suction pad 20 is sucked toward the side of the adapter plate 40 via the vacuum passages 130a, 130b, and an interior space 128 of the suction pad 20 is placed in a substantially vacuum state.

Thus, by bringing the skirt portion 22 of the suction pad 20 into contact with, for example, a plate-shaped workpiece (not shown), the workpiece is attracted (drawn under suction) to the suction pad 20, and the workpiece is transferred together with the suction pad 20 to a predetermined position.

Thereafter, as needed, if supply of compressed air via the one-touch coupling 248 is halted, the check valves 216a, 216b block the first hole 44a and the third hole 44b of the adapter plate 40, and a constant negative pressure condition is maintained in the interior space 128 of the suction pad 20. In addition, after the workpiece has been transported to a predetermined position, by removing the third plug 76 of the adapter plate 40 and opening the interior of the suction pad 20 to atmosphere, or alternatively, by supplying air from an air supply system (not shown) connected to the sixth hole 60, the negative pressure state in the interior space 128 of the suction pad 20 is broken and the workpiece separates away from the suction pad 20.

Thus, in the event that changes over time occur in the suction pad 20 after the suction pad 20 has been used over a long time period, the second operating member 102b of the lock plate 100 is displaced so as to separate away from the ejector 200. Consequently, the small diameter portion 106 is detached from the lock plate groove 134 of the retaining stud 120, and the second cylindrical section 126 of the retaining stud 120 is brought into confronting relation with respect to the large diameter portion 108 of the lock plate 100.

As a result, the retaining stud 120 is easily pulled downward from the large diameter portion 108, which defines a space that is larger in diameter than the lock plate groove 134. Consequently, the suction pad 20 can be detached from the adapter plate 40, and owing thereto, exchange and replacement of the suction pad 20 can easily be performed.

According to the present embodiment, the ejector equipped suction apparatus 10 can be constituted by the simple structure described above, and further, in order to remove the suction pad 20 from the adapter plate 40, the lock plate 100 may simply be displaced and detached from the lock plate groove 134 of the retaining stud 120. Owing thereto, advantages are achieved in that operations to exchange and replace the suction pad 20 can easily be carried out, ease of maintenance is improved, and handling is remarkably facilitated when such exchange operations are required.

While the invention has been particularly shown and described with reference to preferred embodiments, it will be understood that variations and modifications can be effected thereto by those skilled in the art without departing from the scope of the invention as defined by the appended claims.

What is claimed is:

1. An ejector equipped suction apparatus comprising:
   a suction pad;
   an adapter plate fixed to a mounting portion formed on a top portion of the suction pad;
   an ejector disposed on the adapter plate;

a lock plate disposed displaceably on an upper surface of the adapter plate; and a retaining stud, which is inserted from a side of a skirt portion that constitutes part of the suction pad and penetrates through a hole provided in the adapter plate, to thereby engage with the lock plate.

2. The ejector equipped suction apparatus according to claim 1, wherein the retaining stud includes a lock plate groove that engages with the lock plate, and the lock plate comprises a locking member, such that when the locking member engages with the lock plate groove, the retaining stud is pulled to a side of the adapter plate, and the suction pad is retained between the adapter plate and the retaining stud.

3. The ejector equipped suction apparatus according to claim 1, wherein the retaining stud includes a vacuum passage that communicates with the interior of the suction pad and also communicates with a negative pressure generating section of the ejector.

4. The ejector equipped suction apparatus according to claim 3, wherein the adapter plate comprises a hole that communicates with the negative pressure generating section of the ejector and the vacuum passage of the retaining stud.

5. The ejector equipped suction apparatus according to claim 1, wherein the lock plate includes a locking member in which there are formed a large diameter hole portion in which the retaining stud is loosely fitted, and a small diameter hole portion that communicates with the large diameter hole portion and which engages with a lock plate groove provided on the retaining stud.

6. The ejector equipped suction apparatus according to claim 5, wherein the locking member comprises a flat surface that bulges upwardly from a location where the large diameter hole portion is formed, and the small diameter hole portion is formed on the flat surface.

7. The ejector equipped suction apparatus according to claim 1, wherein one of a concave part and a convex part is formed on the adapter plate, and one of a convex part and a concave part is formed on the lock plate, and wherein the lock plate is positioned and retained on the adapter plate through engagement of the concave part and the convex part.

8. The ejector equipped suction apparatus according to claim 1, wherein a mounting bracket is disposed on the adapter plate so as to cover the lock plate, the mounting bracket comprising a retaining member that engages with a transfer apparatus.

9. The ejector equipped suction apparatus according to claim 1, wherein a plate made of hard resin is incorporated in the suction pad on a mounting surface side thereof on which the adapter plate is mounted.

* * * * *